United States Patent
Langel

(10) Patent No.: US 9,745,959 B2
(45) Date of Patent: Aug. 29, 2017

(54) INRUSH CURRENT PROTECTION FOR WIND TURBINES AND WIND FARMS

(71) Applicant: General Electric Company, Schenectady, NY (US)

(72) Inventor: Andre Langel, Stadtlohn (DE)

(73) Assignee: General Electric Company, Schenectady, NY (US)

( * ) Notice: Subject to any disclaimer, the term of this patent is extended or adjusted under 35 U.S.C. 154(b) by 1054 days.

(21) Appl. No.: 13/951,786

(22) Filed: Jul. 26, 2013

(65) Prior Publication Data

US 2013/0307271 A1    Nov. 21, 2013

Related U.S. Application Data

(62) Division of application No. 13/235,345, filed on Sep. 16, 2011, now Pat. No. 8,519,568.

(51) Int. Cl.
*F03D 7/00* (2006.01)
*F03D 9/00* (2016.01)
(Continued)

(52) U.S. Cl.
CPC ............. *F03D 9/003* (2013.01); *F03D 7/00* (2013.01); *F03D 7/042* (2013.01); *F03D 7/048* (2013.01); *F03D 9/11* (2016.05); *F03D 9/255* (2017.02); *F03D 9/257* (2017.02); *H02J 3/386* (2013.01); *H02J 3/42* (2013.01); *H02J 9/06* (2013.01); *F05B 2260/42* (2013.01);
(Continued)

(58) Field of Classification Search
CPC ............. Y10T 307/724–307/735; F03D 7/026
USPC .................................................. 307/85–87
See application file for complete search history.

(56) References Cited

U.S. PATENT DOCUMENTS 8,000,840 B2 *  8/2011  Nielsen ............... F03D 7/026
                                                    290/43
8,405,252 B2    3/2013  Schuette et al.
(Continued)

FOREIGN PATENT DOCUMENTS

CN         1926742 A       3/2007
CN       101621205 A       1/2010
(Continued)

OTHER PUBLICATIONS

Liang-Bo et al., "Study on Grid-Connected Wind Energy Conversion System", Research and Development, pp. 48-51, Jan. 31, 2006.
(Continued)

*Primary Examiner* — Fritz M Fleming
(74) *Attorney, Agent, or Firm* — GE Global Patent Operation; Douglas D. Zhang

(57) ABSTRACT

A wind turbine is provided. The wind turbine includes a transformer having a low-voltage side and a high-voltage side. The transformer is configured to step up a voltage of the low-voltage side of the transformer to a voltage of an external grid. The wind turbine further includes an electrical power generating unit which is connected to the low-voltage side of the transformer and configured to feed an ac-power to the low-voltage side of the transformer. A charging device of the wind turbine is connected to the low-voltage side of the transformer and configured to charge the low-voltage side of the transformer when the generator does not feed ac-power to the low-voltage side of the transformer.

11 Claims, 6 Drawing Sheets

(51) Int. Cl.
    *H02J 3/38*     (2006.01)
    *H02J 3/42*     (2006.01)
    *H02J 9/06*     (2006.01)
    *F03D 7/04*     (2006.01)
    *F03D 9/11*     (2016.01)
    *F03D 9/25*     (2016.01)

(52) U.S. Cl.
    CPC ................ *F05B 2270/1071* (2013.01); *F05B 2270/10711* (2013.01); *Y02B 10/72* (2013.01); *Y02E 10/723* (2013.01); *Y02E 10/763* (2013.01); *Y02E 10/766* (2013.01); *Y02E 20/14* (2013.01); *Y10T 307/615* (2015.04); *Y10T 307/724* (2015.04); *Y10T 307/735* (2015.04)

(56) References Cited

U.S. PATENT DOCUMENTS

| | | |
|---|---|---|
| 2007/0228836 A1 | 10/2007 | Teichmann |
| 2007/0273155 A1 | 11/2007 | Barton et al. |
| 2009/0160187 A1* | 6/2009 | Scholte-Wassink .. F03D 7/0284 290/44 |
| 2009/0224607 A1 | 9/2009 | Kjaer et al. |
| 2011/0175620 A1 | 7/2011 | Letas |
| 2011/0260547 A1 | 10/2011 | Wang et al. |
| 2012/0261917 A1* | 10/2012 | Egedal .................... F03D 7/026 290/44 |

FOREIGN PATENT DOCUMENTS

| | | | |
|---|---|---|---|
| CN | 201682292 U | 12/2010 | |
| DE | 202007016800 U1 | 4/2009 | |
| EP | 2075905 A1 | 1/2009 | |
| EP | 2 072 813 A2 | 6/2009 | |
| EP | 2570661 A2 * | 3/2013 | ............. H02J 3/386 |
| EP | 2570661 B1 * | 4/2016 | ............. H02J 3/386 |
| WO | 2012/163398 A1 | 12/2012 | |

OTHER PUBLICATIONS

Zhi-Yuan et al., "Energy Management under the Coordination Control Framework for Off-Grid Wind Power Generation System", The Journal of Solar Energy, vol. No. 30, Issue No. 4, pp. 503-508, Apr. 30, 2009.

Unofficial English Translation of Chinese Office Action issued in connection with corresponding CN Application No. 201210342075.9 on Nov. 18, 2014.

European Search Report issued in connection with EP Patent Application No. 12183566.4 dated Jan. 19, 2015.

* cited by examiner

INRUSH CURRENT PROTECTION FOR WIND TURBINES AND WIND FARMS

CROSS-REFERENCE TO RELATED APPLICATION

This is a divisional application and claims priority of U.S. patent application Ser. No. 13/235,345, filed Sep. 16, 2011, the entirety of which is incorporated herein by reference.

BACKGROUND OF THE INVENTION

The subject matter described herein relates generally to methods and systems for wind turbines, and more particularly, to methods and systems for protecting a wind turbine and a wind farm against inrush currents after grid recovery.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with predefined rated power limits. To operate within such rated power limits, the electrical and/or mechanical components may be operated with large margins for the operating limitations. Such operation may result in inefficient wind turbine operation, and a power generation capability of the wind turbine may be underutilized.

Nearly every power generating plant—be it a nuclear power plant, a cogeneration plant, a hydro power station, coal power station, a gas power station, or a wind power station, in the following also referred to as wind farm—generates the current by one or more generators which converts mechanical energy into electrical power. Typically, the electric power of the generators is feed into the utility grid via transformers. For example, the generators of the wind turbines of a wind farm are typically connected to individual transformers coupled via a main transformer of a substation to the utility grid. When the utility grid comes back after an outage, the individual transformers of the wind turbines are still connected and are all energized at the same moment. This may result in a very high inrush current peak. Accordingly, the main transformer in the substation may be disconnected from the utility grid due to an unwanted protection relay tripping. Furthermore, the inrush current peak may lead to resonances and/or oscillations in the power distribution system and/or to high mechanical loading of the transformer windings which may result in reduced transformer lifetime.

In view of the above, there is a desire for improved inrush current reduction and/or inrush current protection of power generating plants, in particular wind farms.

BRIEF DESCRIPTION OF THE INVENTION

In one aspect, a wind turbine is provided. The wind turbine includes a transformer having a low-voltage side and a high-voltage side. The transformer is configured to step up a voltage at the low-voltage side of the transformer to a voltage of an external grid. The wind turbine further includes an electrical power generating unit which is connected to the low-voltage side of the transformer and configured to feed an ac-power to the low-voltage side of the transformer. A charging device of the wind turbine is connected to the low-voltage side of the transformer and configured to charge the low-voltage side of the transformer when the electrical power generating unit does not feed ac-power to the low-voltage side of the transformer.

In another aspect, a wind farm is provided. The wind farm includes a wind farm grid and a main transformer which is connected to the wind farm grid and configured to step up a voltage of the wind farm grid to a voltage of a utility grid to which the wind farm is connected. The wind farm further includes at least one wind turbine, a transformer and a switch. The at least one wind turbine includes an internal grid, an electrical power generating unit connected to the internal grid and configured to feed an ac-power of a rated voltage to the internal grid, and a charging device connected to the internal grid. The transformer is connected to the internal grid of the wind turbine and configured to step-up the rated voltage of the electrical power generating unit to the voltage of the wind farm grid. The switch is connected between the wind farm grid and the transformer and configured to open and close a connection between the transformer and the wind farm grid. The charging device is configured to feed ac-power to the internal grid of the wind turbine when the switch is open.

In yet another aspect, a method for connecting a transformer to a grid after a grid failure is provided. The method includes detecting a recovery of the grid, buffering energy of the grid, and charging a low-voltage side of the transformer with the buffered energy while a high-voltage side of the transformer is disconnected from the grid so that the high-voltage side of the transformer is substantially in phase with the grid. The method further includes connecting the high-voltage side of the transformer and the grid.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Figure 1:
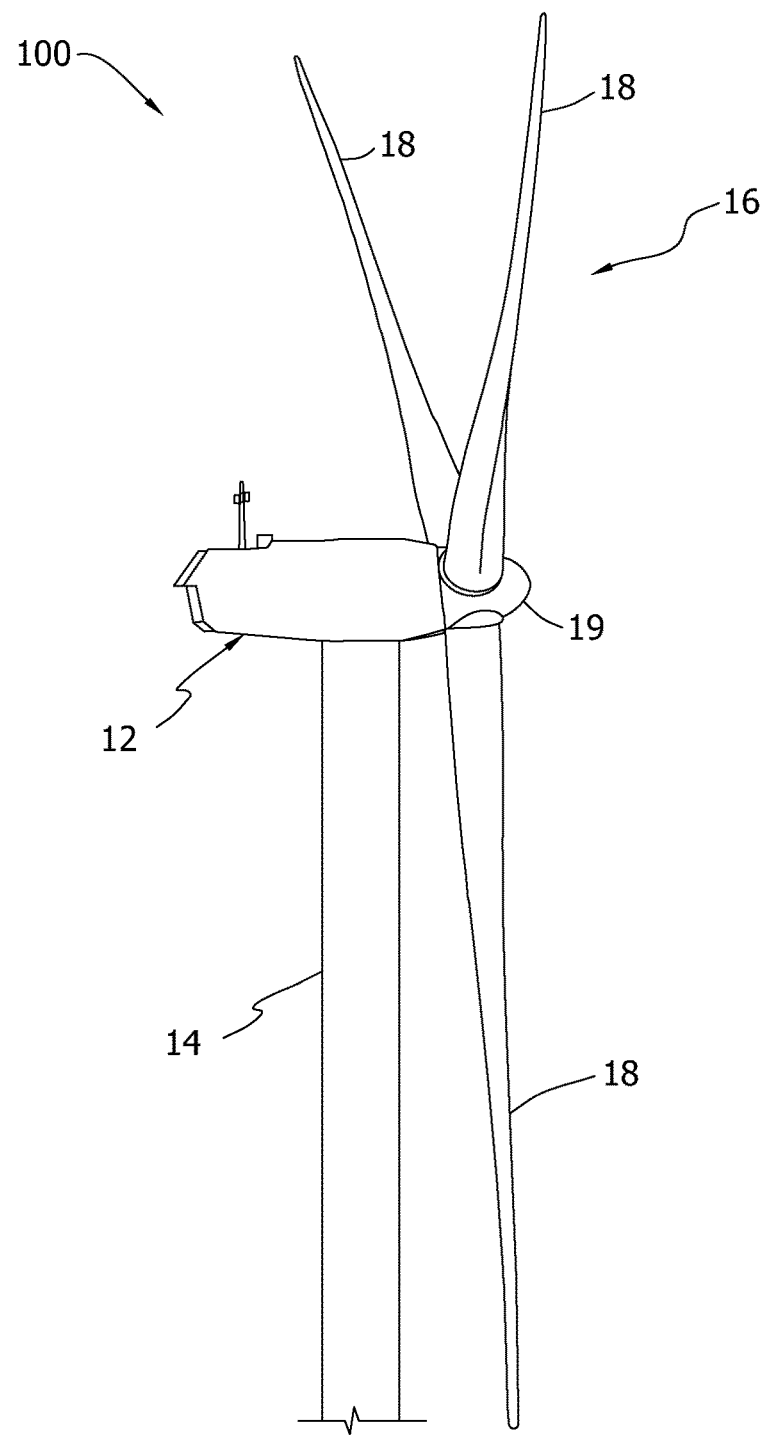
FIG. 1 is a perspective view of a portion of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system having a charging device for a transformer, a wind farm with such wind turbines and a related method. Due to charging a low-voltage side of the transformer after a grid recovery and prior to connecting a high-voltage side of the transformer back to the grid, high inrush currents are avoided when the high-voltage side of the transformer is connected to the grid. Accordingly, mechanical loads of the transformer windings, resonances and/or oscillations in the grid and the power distributing system, respectively, as well as disconnecting of a main transformer arranged between the transformer and a utility grid may be avoided.

As used herein, the term "grid failure" intends to describe a drop of a voltage and/or a frequency below respective lower rated values of a grid, typically a utility grid, or an increase of the voltage and/or the frequency above respective upper rated values of the grid. As used herein, the term "grid failure" shall embrace an outage of the grid. As used herein, the term "transformer" is intended to be representative of any device that transfers electrical energy from one circuit or grid to another through inductively coupled conductors, i.e. through coils or windings of the transformer. The transformer typically includes a low-voltage side connected to primary windings of the transformer and a high-voltage side connected to secondary windings of the transformer. As used herein, the terms "low-voltage side of a transformer" and "high-voltage side of a transformer" intend to describe that the voltage at the low voltage-side of the transformer is during normal operation lower than the voltage of the high-voltage side of the transformer. The term "low-voltage side of a transformer" shall not be limited to low voltages. For example, the low-voltage side of a transformer may correspond to a voltage of 110 V, 230 V, 690 V, 10 kV or even more. The corresponding high-voltage side of the transformer may correspond to a voltage of 690 V, 10 kV, 100 kV or even higher. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "electrical power generating unit" is intended to be representative of any device that generates electrical power from rotational energy, and more specifically, converts mechanical energy converted from kinetic energy of wind to ac electrical power. The electrical power generating unit may, for example, be formed by a rotating generator. The term "electrical power generating unit" shall also embrace devices that include a generator and a frequency converter or an inverter to convert at least a part of the electric power converted by the generator from the rotational energy.

FIG. 1 is a perspective view of a portion of an exemplary wind turbine 100. Wind turbine 100 includes a nacelle 12 housing a generator (not shown in FIG. 1). Nacelle 12 is mounted on a tower 14 (a portion of tower 14 being shown in FIG. 1). Tower 14 may have any suitable height that facilitates operation of wind turbine 100 as described herein. Wind turbine 100 also includes a rotor 16 that includes three blades 18 attached to a rotating hub 19. Alternatively, wind turbine 100 includes any number of blades 18 that facilitates operation of wind turbine 100 as described herein. In the exemplary embodiment, wind turbine 100 includes a gearbox (not shown in FIG. 1) operatively coupled to rotor 16 and a generator (not shown in FIG. 1).

Figure 2:
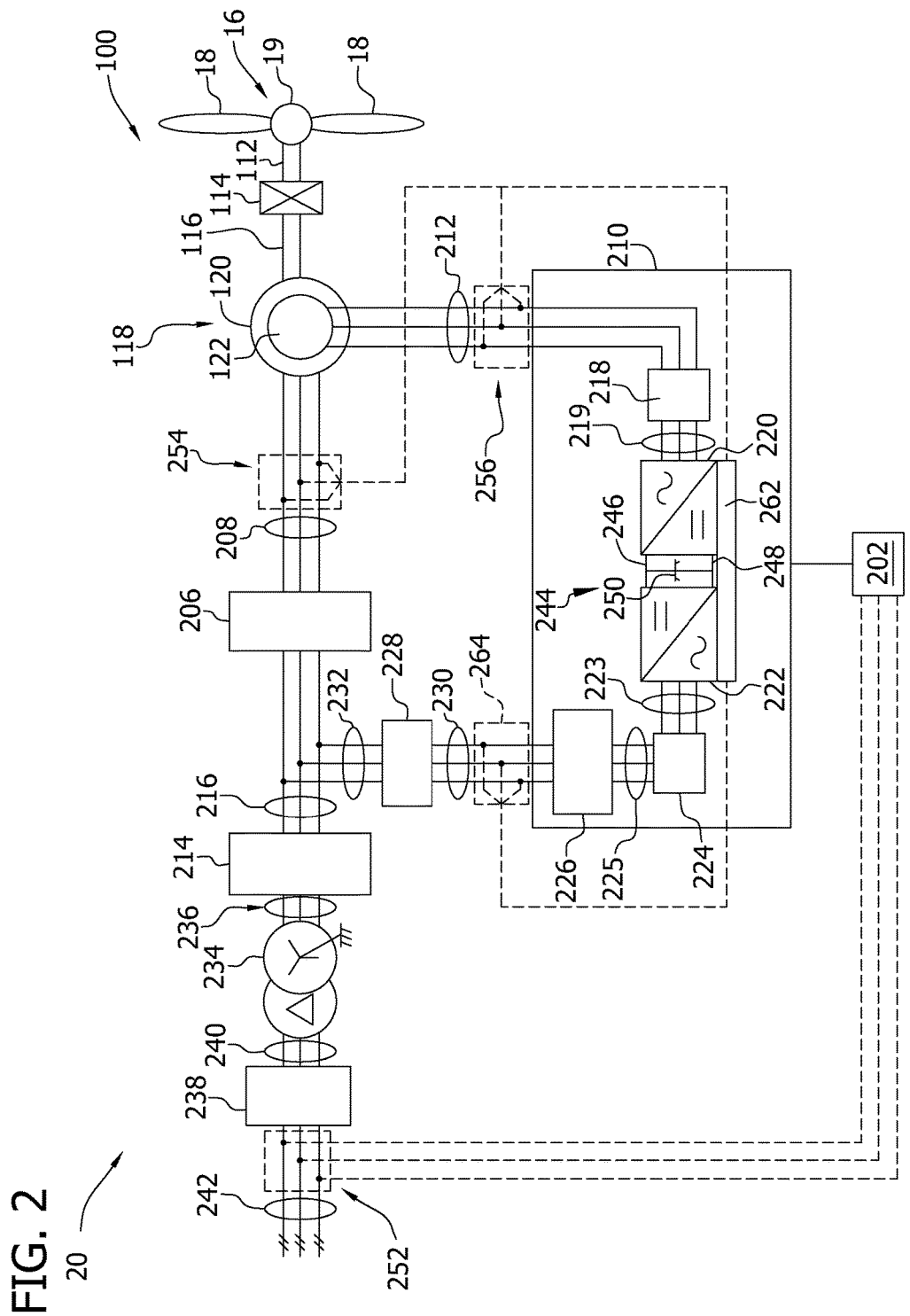
FIG. 2 is a schematic view of a portion of an exemplary electrical and control system suitable for use with the wind turbine shown in FIG. 1.

FIG. 2 is a schematic view of an exemplary electrical and control system 20 that may be used with wind turbine 100. Rotor 16 includes blades 18 coupled to hub 19. Rotor 16 also includes a low-speed shaft 112 rotatably coupled to hub 19. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings to form a synchronous generator. The synchronous generator may be connected to a frequency converter to allow for variable speed operation of the synchronous generator. In a further alternative embodiment, the generator is a single-fed asynchronous induction generator having electrically excited rotor windings. In still an alternative embodiment, the generator is a dc-generator which is connected to an inverter to convert the produced direct current (dc) of the dc-generator to alternating current (ac).

Electrical and control system 20 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 20 as described herein. As a further alternative, electrical and control system 20 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220 and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 20 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 20. Main transformer circuit breaker 214 is electrically coupled to an electric power main transformer 150 via a generator-side bus 236. Main transformer 150 is electrically coupled to a grid circuit breaker 238 via a breaker-side bus 240. Grid circuit breaker 238 is connected to the electric power transmission and distribution grid via a grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 20 that facilitates operation of electrical and control system 20 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 20 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 20 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 150 via stator bus 208, stator synchronizing switch 206, system bus 216, main transformer circuit breaker 214 and generator-side bus 236 forming an internal grid. Main transformer 150 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 20. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 20. The control signals are received by turbine controller 202 and used to control operation of power conversion assembly 210. Feedback from one or more sensors may be used by electrical and control system 20 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
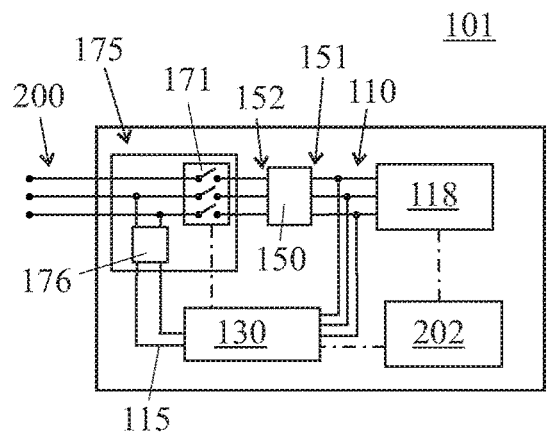
FIG. 3 is a schematic view of a wind turbine according to an embodiment.

FIG. 3 is a schematic view of a wind turbine 101 according to an embodiment. Wind turbine 101 includes a generator 118 forming an electrical power generating unit, for example a DFIG as explained above with regard to FIG. 2 and a turbine controller 202. Generator 118 is connected to an internal grid 110 of wind turbine 101 and configured to feed an ac-power, for example a 50 Hz or 60 Hz three-phase ac power of 690 V, to internal grid 110. As explained above with regard to FIG. 2, turbine controller 202 is typically configured to control at least generator 118. This is indicated by the dashed-dotted between turbine controller 202 and generator 118.

In the exemplary embodiment, wind turbine 101 includes a transformer 150 having a low-voltage side 151 connected to the internal grid 110 and a high-voltage side 152. Transformer 150 is configured to step up a voltage of the low voltage side, for example 690 V, to a voltage of an external grid. In the following transformer 150 is also referred to as wind turbine transformer. Typically, the external grid 200 is a wind farm grid with a rated voltage of about 10 kV up to about 50 kV to which wind turbine 101 is connected during normal operation. In other embodiments, wind turbine 101 is, during normal operation, directly connected to a utility grid.

In the exemplary embodiment, the low-voltage side 151 of transformer 150 is connected to generator 118 via the internal grid 110. The high-voltage side 151 of transformer 150 is connectable to external grid 200 via a medium voltage switch gear 175 which disconnects transformer 150 from the external grid 200 in the event of a grid failure such as an outage of the external grid 200.

In other embodiments, a frequency converter or an inverter is connected between the generator and internal grid 110 to convert the electrical power generated by the generator to a rated ac-power of internal grid 110. In these embodiments, the generator and the frequency converter, or the generator and the inverter form the electrical power generating unit of the wind turbine.

The electric power generating unit has a rated output voltage that matches a rated voltage of internal grid of, for example, 690 V. Depending on design of the electric power generating unit, its rated output voltage corresponds to the rated output voltage of the generator, the inverter or the frequency converter that is connected via internal grid 110 to the low voltage side 151 of transformer 150.

According to an embodiment, wind turbine 101 includes a charging device 130 which is connected to the low voltage side 151 of the transformer 150 via the internal grid 110. Charging device 130 is configured to charge the internal grid 110 and the low-voltage side 151 of the transformer 150, respectively, when the generator 118 does not feed ac-power to the internal grid 110, typically after a grid failure resulting in disconnecting low-voltage side 151 of transformer 150 from external grid 200. Accordingly, charging device 130 can charge the internal grid 110 after recovery of external grid 200 and prior to connecting the high-voltage side 152 of transformer 150 back to external grid 200. In doing so, inrush currents may be avoided or at least reduced when the high-voltage side 152 of transformer 150 is connected to external grid 200. Accordingly, mechanical loads of the windings of transformer may at least be reduced and further resonances and/or oscillations of the electric system formed by wind turbine 101 and external grid 200 reduced and substantially avoided, respectively.

After charging the internal grid and the low-voltage side 151 of transformer 150, respectively, the charging device 130 typically sends a signal to medium-voltage switch gear 175 to close its switch 171 and thus to connect external grid 200 and high-voltage side 152 of transformer 150. For this purpose at least one signal line, for example a TTL-line or a LAN-cable, is arranged between charging device 130 and medium-voltage switch gear 175 as indicated by the dashed-dotted line in FIG. 3. Typically, charging device 130 is also connected via at least one signal line with the turbine controller 202 to exchange information. For example, turbine controller 202 may issue the command to close switch 171 via charging device 130. Accordingly, a SCADA system connected with or running on turbine controller 202 may switch several wind turbines 101 after each other back to the external grid 200 formed by a wind park grid. Accordingly, inrush currents may be even further reduced.

In the exemplary embodiment, medium-voltage switch gear 175 further includes an internal voltage transformer 176 usually used to measure the voltage of external grid 200. Accordingly, a high voltage side of voltage transformer 176 is connected to external grid 200. The voltage of external grid 200 can be stepped-down by voltage transformer 176—after recovery of external grid 200—to a supply voltage, for example to a two-phase 110 V or 230 V voltage. In the exemplary embodiment, charging device 130 is connected to a low-voltage side of voltage transformer 176 via a low voltage grid 115. Accordingly, a recovery of external grid 200 may be detected by charging device 130 via low voltage grid 115. Furthermore, charging device 130 may buffer and use electrical energy of low voltage grid 115 to charge internal grid 110 and transformer 150, respectively. This is explained in more detail below with regard to FIGS. 7 and 8.

Figure 4:
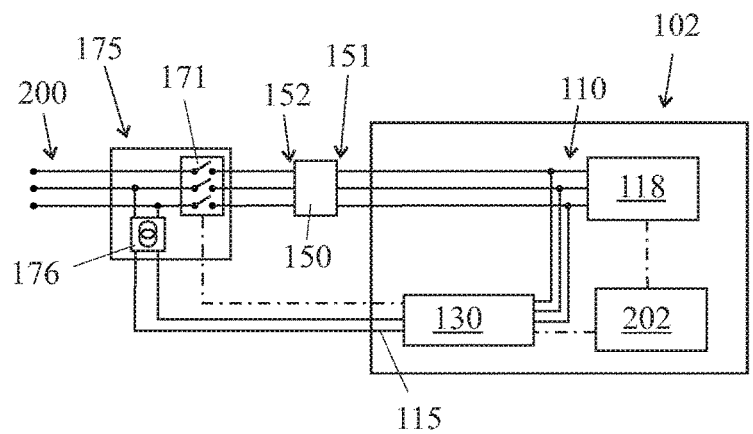
FIG. 4 is a schematic view of a wind turbine according to another embodiment.

FIG. 4 is a schematic view of a wind turbine 102 according to another embodiment. Wind turbine 102 shown in FIG. 4 is very similar to the exemplary embodiment described above with regard to FIG. 3. However, medium-voltage switch gear 175 and transformer 150 are arranged outside of wind turbine 102, for example in an additional building next to the tower of wind turbine 102. In such an arrangement, medium-voltage switch gear 175 and transformer 150 are also considered to be parts of the wind turbine 102 as they form a functional unit that need not be arranged in a single construction.

Figure 5:
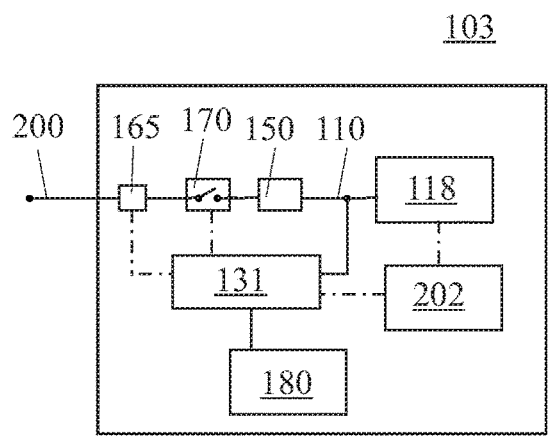
FIG. 5 is a schematic view of a wind turbine according to yet another embodiment.

FIG. 5 is a schematic view of a wind turbine 103 according to yet another embodiment. Wind turbine 103 shown in FIG. 5 is very similar to the exemplary embodiment described above with regard to FIG. 3. However, instead of a medium-voltage switchgear, wind turbine 103 includes a switch 170 which is connected between external grid 200 and the high-voltage side of transformer 150 to open and close a connection between the high voltage side of transformer 150 and external grid 200. A charging device 131 is connected to the internal grid 110 and configured to charge internal grid 110 and to cause closing switch 171. Internal grid 110 and external grid 200 may also be three-phase grids. For sake of clarity, only one respective line of grids 110, 200 is shown in FIG. 5. This applies also to the following Figures.

Furthermore, wind turbine 103 includes a sensor 165, typically a capacitive sensor, connected to external grid 200 and charging device 131. Accordingly, charging device 131 can detect the recovery of external grid 200.

In the exemplary embodiment, charging device 131 is connected to a long-term energy storage 180 such as a battery to provide energy for charging transformer 150 after grid recovery and prior to connecting the high voltage side of transformer 150 back to external grid 200.

Figure 6:
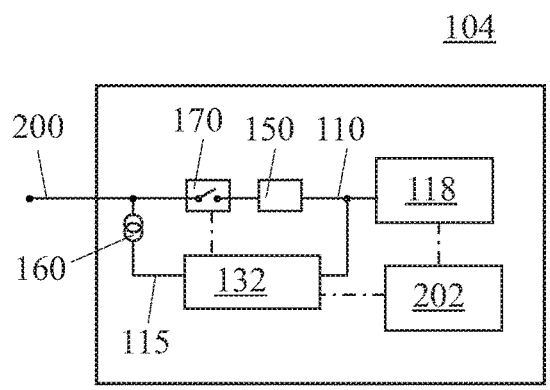
FIG. 6 is a schematic view of a wind turbine according to still another embodiment.

FIG. 6 is a schematic view of a wind turbine 104 according to still another embodiment. Wind turbine 103 shown in FIG. 6 is very similar to the exemplary embodiment described above with regard to FIG. 3. However, instead of a medium-voltage switchgear, wind turbine 103 includes a switch 170 which is connected between external grid 200 and the high-voltage side of transformer 150 to open and close a connection between the high voltage side of transformer 150 and external grid 200. A charging device 132 is connected to the internal grid 110 and configured to charge internal grid 110 and to cause closing switch 170.

In the exemplary embodiment, an additional transformer 160 is with its high voltage side connected to the external grid 200. A low-voltage side of additional transformer 160 is connected to charging device 132. Similar as explained above with regard to FIG. 3 for the voltage transformer of the switchgear, charging device 132 can use the low-voltage side of additional transformer 160 to detect the recovery of external grid 200 and/or use buffered electric power of the low-voltage side of additional transformer 160 to charge transformer 150 prior to connecting the high-voltage side of transformer 150 back to external grid 200. In other words, additional transformer 160 may be used both as sensor and power supply.

Figure 7:
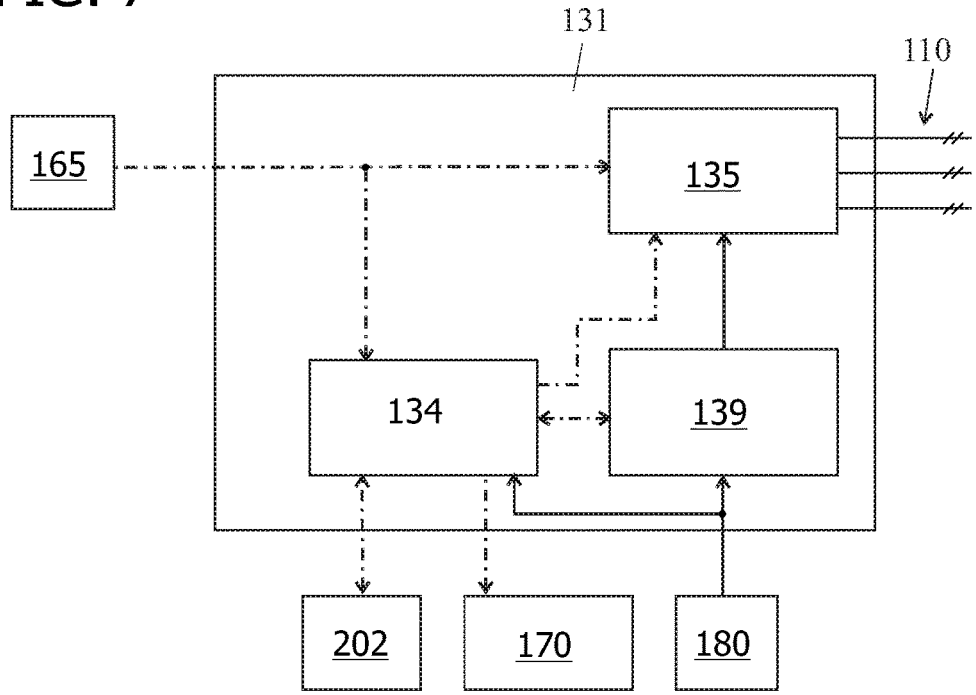
FIG. 7 is a schematic view of a charging device for wind turbines according to an embodiment.

FIG. 7 is a schematic view of a charging device 131 for wind turbines according to an embodiment. Charging device 131 may, for example, be used in the wind turbine as explained above with regard to FIG. 5. Charging device 131 includes an inverter 135 which may be connected to a low voltage side of a wind turbine transformer (not shown in FIG. 7) and an internal grid 110 connected to the generator (not shown in FIG. 7), respectively. According to an embodiment, inverter 135 is configured to output at least one rising ac output-signal to the internal grid 110, for example a three-phase ac output-signal, to charge internal grid 110 and the wind turbine transformer, respectively, after recovery of the external grid. Typically, inverter 135 is configured to ramp the at least one rising ac output-signal to a rated voltage of the generator, for example to 690 V. Accordingly, an inrush current after back connecting of the wind turbine transformer to the external grid may almost or even completely be avoided.

Typically, charging device 131 includes a controller 134. In the exemplary embodiment, charging device 131 is connected to inverter 135 to control inverter 135, to the switch 170 of the wind turbine to cause closing of switch 170 after charging the wind turbine transformer, and to the sensor 165 of the wind turbine to detect the recovery of the external grid. This is indicated by dashed-dotted arrows between the respective units, wherein the arrow heads indicate the flow of information during operation.

Furthermore, charging device 131 is typically connected to the turbine controller 202 as explained above with regard to FIG. 3.

Controller 134 is typically configured to cause closing switch 170 after a voltage of internal grid 110 and output of inverter 135, respectively, has reached a suitable predefined value, typically the rated voltage of the generator and the electrical power generating unit, respectively, or at least 80% of the rated voltage, more typically at least 90%, even more typically at least 95% of the rated voltage of the generator and the electrical power generating unit, respectively.

In the exemplary embodiment, controller 134 is configured to detect a recovery of the external grid via the sensor 165 which may for example send after recovery of the external grid an ac TTL-signal which is in defined phase relation with the external grid. The ac TTL-signal may also be transferred to inverter 135 which typically outputs to internal grid 110 a signal that is phase shifted to the ac TTL-signal to compensate delays and phase-shifts, respectively. Accordingly the phase of the internal grid is set such that there is substantially no phase-shift when the transformer is connected back to the external grid. Typically, controller 134 controls inverter 135 such that at least one rising ac output-signal is in defined phase-relation, for example in phase, with the external grid.

Furthermore, charging device typically includes an energy buffer 139, for example a capacitor, which is connected to the inverter 135 to provide in a comparatively short time of about several ten milliseconds to about several seconds, more typically of about 100 ms to about 1 s, and even more typically of about 300 ms to about 800 ms, enough electrical energy to charge internal grid 110 and the wind turbine transformer, respectively, via inverter 135. Energy buffer 139 may be charged from a battery 180 of the wind turbine that may also supply electric power to controller 134. Typically, controller 134 issues charging of an energy buffer 139 after recovery of the external grid and charging of internal grid 110 after energy buffer 139 is charged.

Figure 8:
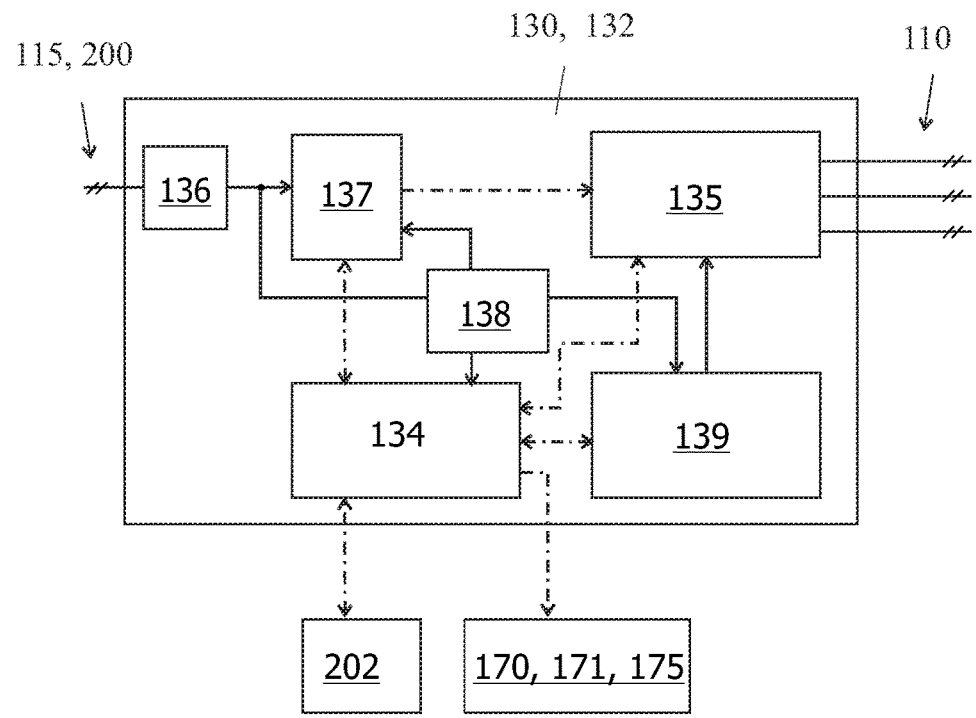
FIG. 8 is a schematic view of a charging device for wind turbines according to another embodiment.

FIG. 8 is a schematic view of a charging device 130 for wind turbines according to another embodiment. Charging device 130 may, for example, be used in the wind turbine as explained above with regard to FIGS. 3 and 4 but also as charging device 132 of the wind turbine as explained above with regard to FIG. 6. Charging device 130 shown in FIG. 8 is similar to the exemplary embodiment described above with regard to FIG. 7. However, charging device 130 is connected via a transformer with the external grid 200 to which a high-voltage side of the wind turbine transformer is connected. The wind turbine transformer may be a voltage transformer of a medium-voltage switch gear, as explained above with regard to FIG. 3, an additional transformer, as explained above with regard to FIG. 6, or an optional internal transformer 136 of charging device 130 as shown in FIG. 8. The ac-signal of the low-voltage side of the transformer 136 is typically used both to charge energy buffer 139 and to detect the recovery of the external grid 200 using a sensor 137, typically a capacitive sensor, connected between the low-voltage side of transformer 136 and controller 134.

Typically, an ac-to-dc power pack 138 is used to supply energy buffer 139, sensor 137 and controller 134.

Figure 9:
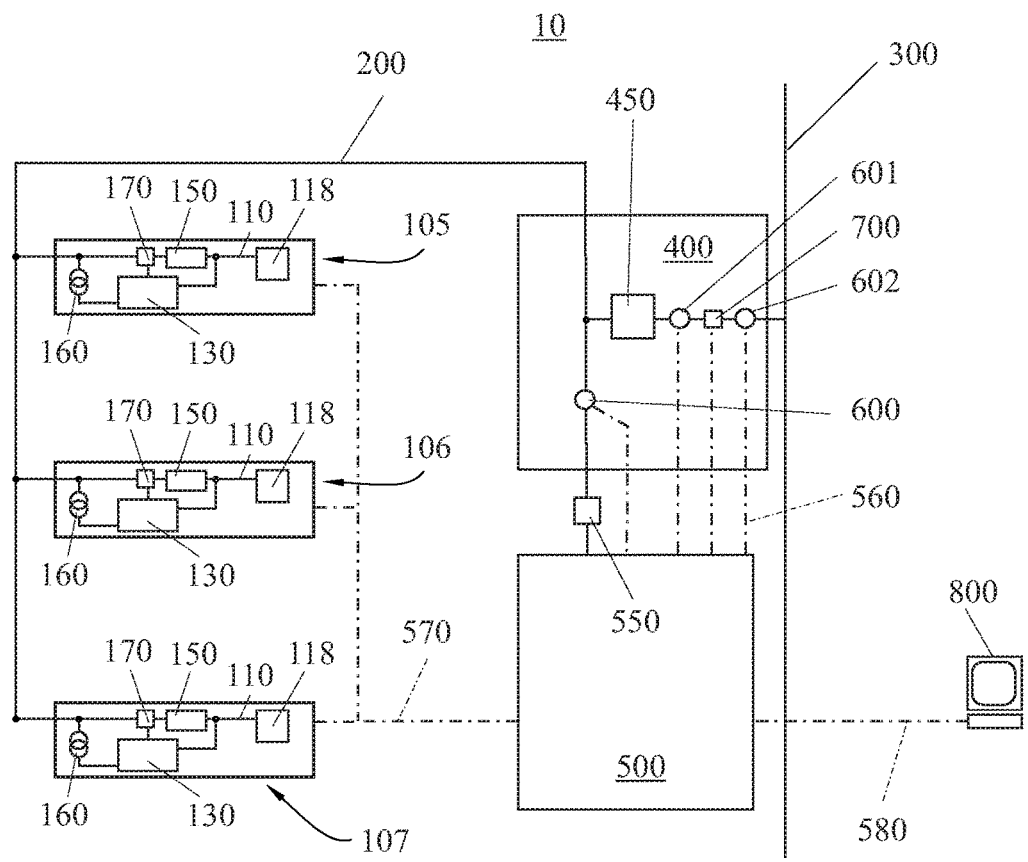
FIG. 9 is a schematic view of a wind farm according to an embodiment.

FIG. 9 is a schematic view of a wind farm 10 according to an embodiment. Wind farm 10 includes a wind farm grid 200 to which one, more typically a plurality of wind turbines 105, 106, 107 are connected. The three exemplarily shown wind turbines 105, 106, 107 may be any of the wind turbines explained above with regard to FIGS. 3 to 6.

The internal grid 200 is typically a medium voltage, three-phase alternating current (ac) network operating e.g. at a few kV up to a few 10 kV and 50 Hz or 60 Hz. A station transformer or main transformer 450 of a transformer substation 400 is used to step up voltage from the internal grid voltage to a required transmission voltage of the external, main or utility grid 300 to which the transformer substation 400 can be connected at the point-of-common-coupling (PCC) using a suitable power switch 700. Further, the internal grid 200 typically powers a central controller 500 via a transformer 550. The central controller 500 is arranged for communication with the wind turbines 105 to 107 via communication links 570, which may be implemented in hardware and/or software. Further, the central controller 500 may be configured to communicate via communication links 580 with a SCADA (Supervisory, Control and Data Acquisition) computer 800 to enable remote control. Typically, the communication links 570, 580 are realized as an Ethernet LAN. However, the communication links 550 may also be configured to remotely communicate data signals to and from the central controller 500 in accordance with any fiber optic, wired or wireless communication network known to one skilled in the art. Such data signals may include, for example, signals indicative of operating conditions of individual wind turbine which are transmitted to the central controller 500 and various command signals communicated by the central controller 500 to the wind turbines 105 to 107. The central controller 500 is typically further in communication with the internal grid 200 and the external grid via sensors 600 to 602, such as voltage, current, frequency, power sensors or the like. Note that each of the sensors 600 to 602 may represent different sensors, e.g. for each phase line. Further, the central controller 500 is typically operable to control various switching devices or actuators, such as feeders 700. Note, that the dashed and dashed-dotted lines in FIG. 9 only indicate that there are links between the central controller 500 and the other devices. They do not necessarily reflect the topology of the used communication links 550 and 560.

Each of the wind turbine 105 to 107 includes an internal grid 110, a generator 118 connected to the internal grid 110 and charging device 130 connected to the internal grid 110. Generator 118 is configured to feed an ac-power of a rated voltage to the internal grid 110.

Furthermore, each of the wind turbine 105 to 107 includes a transformer 150 connected to the internal grid 110 and configured to step-up the rated voltage of the generator 118 to the voltage of the wind farm grid 200. Respective switches 170 are connected between the wind farm grid 200 and the transformers 150 to open and close a connection between the transformers 150 and the wind farm grid 200.

According to an embodiment, the charging devices 130 of the wind turbines 105, 106, 107 are configured to feed ac-power to the respective internal grid 110 when the respective switch 170 is open due to a failure of the utility grid causing a failure of wind farm grid 200, typically an outage of wind farm grid 200. When the utility grid 300 recovers, the wind farm grid 200 typically also recovers. Feeding ac-power from charging devices 130 to internal grids 110 results in charging of transformers 150 which are still disconnected from wind farm grid 200. After charging transformers 150, the high voltage sides of transformers 150 are connected back to wind farm grid 200. Due to charging transformers 150 prior to connecting their high-voltage side back to wind farm grid 200, inrush currents are avoided or at least substantially reduced. Accordingly, life time of transformers 150 may be increased and a trip of a breaker in the main transformer station 400 avoided.

Typically, charging devices 130 included an inverter (not shown in FIG. 9) configured to ramp the voltage of the internal grids 110 up to the rated voltage. Ramping of the voltage as well as closing of switches 170 is typically controlled by an internal controller of charging devices 130.

Figure 10:
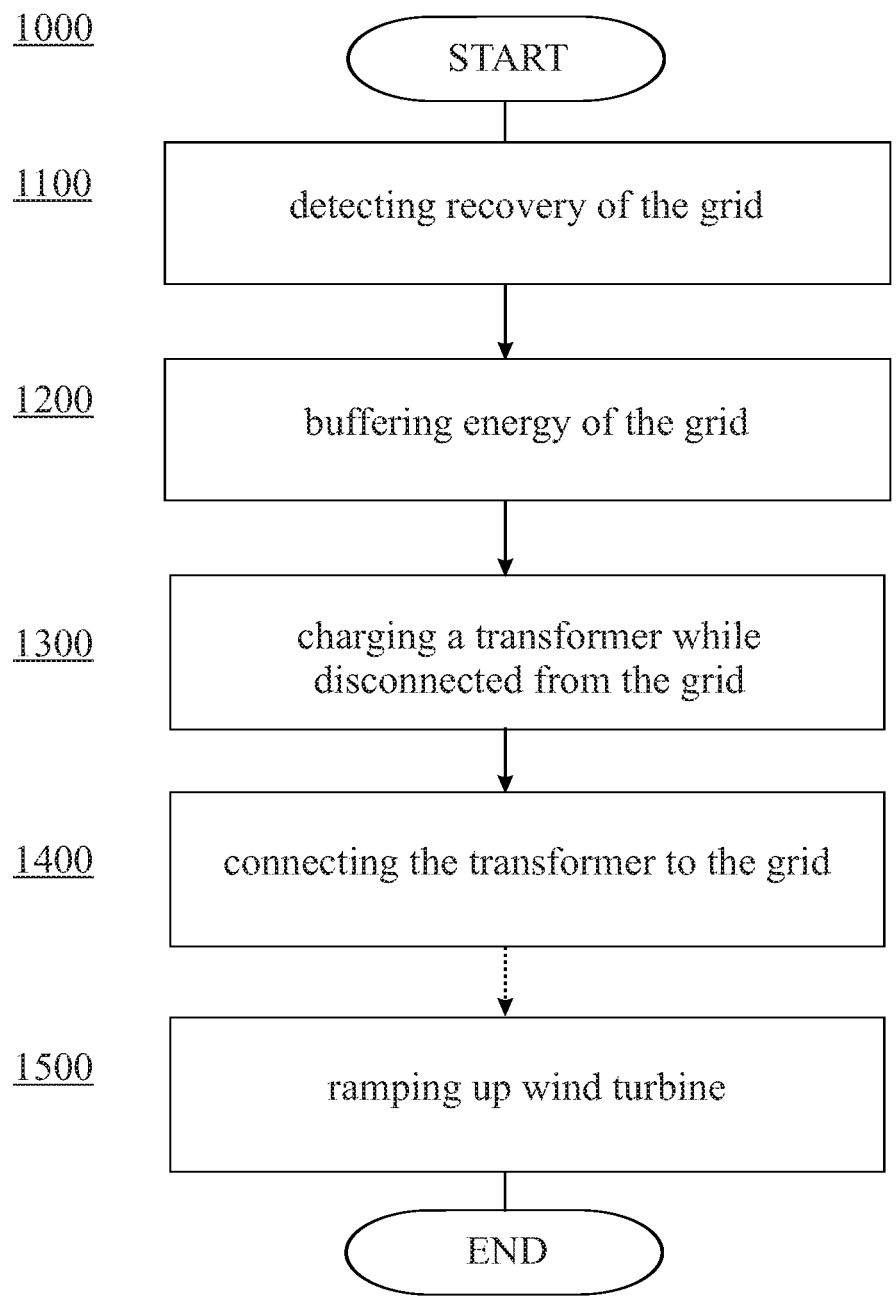
FIG. 10 is a flow diagram for connecting a transformer to a grid after a grid failure according to an embodiment.

FIG. 10 is a flow diagram of a method 1000 for connecting a transformer, typically a wind turbine transformer the low side of which is connected to a generator of a wind turbine, to a grid after a grid failure. In a first block 1100, a recovery of the grid is detected. Block 1100 may include measuring a signal of a low-voltage side of an additional transformer connected with its high voltage side to the grid. The additional transformer may, for example, be a voltage transformer of a switch gear arranged between the grid and a high-voltage side of the transformer.

In a subsequent block 1200, energy of the grid is buffered. For example, power of the low-voltage side of the additional transformer is buffered in a capacitor.

Thereafter, a low voltage side of a transformer is charged with the buffered energy while a high voltage side of the transformer remains disconnected from the grid in a block 1300. This is typically done such that the high voltage side of the transformer is in defined phase relation, for example substantially in phase with the grid. Block 1300 typically includes ramping a voltage of the low voltage side of the transformer up to a predefined value, for example up to a rated voltage of the generator or close to the rated voltage of the generator.

In a subsequent block 1400, the high voltage side of the transformer and the grid are connected. Due to charging the transformer prior to connecting its high-voltage side back to the grid, inrush currents are avoided or at least substantially reduced. Accordingly, life time of the transformer may be increased. Furthermore, oscillations and/or resonances of current and/or voltage of the transformer-grid system may be avoided.

Block 1400 typically includes closing a switch connected between the grid and the high voltage side of the transformer by a controller which typically also controls the charging of block 1300. Closing the switch is typically synchronized with switching off an inverter used for charging the transformer in block 1300.

Thereafter, the generator may be ramped up and synchronized with the low voltage side of the transformer to enable feeding of ac-power into the grid.

The above-described systems and methods facilitate reducing the inrush current of a transformer when the transformer is connected to a grid after recovery of the grid. Thus, mechanical loads of the transformer windings, resonances and/or oscillations in the grid and the power distributing system, respectively, as well as disconnecting of a main transformer arranged between the transformer and a utility grid may be avoided.

Exemplary embodiments of wind turbines and wind farms and related methods are described above in detail. The systems and methods are not limited to the specific embodiments described herein, but rather, components of the systems and/or steps of the methods may be utilized independently and separately from other components and/or steps described herein. For example, charging a low-voltage side of a transformer prior to connecting its high-voltage side to a grid after grid recovery is not limited to practice with only the wind turbine systems as described herein. Rather, the exemplary embodiment can be implemented and utilized in connection with many other power plants.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine comprising:
   a transformer comprising a low-voltage side and a high-voltage side and configured to step up a low voltage at the low-voltage side to a high voltage of an external grid;
   an electrical power generating unit connected to the low-voltage side of the transformer and configured to feed an ac-power to the low-voltage side of the transformer; and
   a charging device connected to the low-voltage side of the transformer and configured to charge the low-voltage side of the transformer with energy buffered from the external grid when the electrical power generating unit does not feed ac-power to the low-voltage side of the transformer.

2. The wind turbine of claim 1, further comprising a switch connected between the external grid and the high-voltage side of the transformer and configured to open and close a connection between the high-voltage side of the transformer and the external grid.

3. The wind turbine of claim 2, wherein the charging device is configured to cause closing the switch after a voltage of the low-voltage side of the transformer has reached a predefined value.

4. The wind turbine of claim 2, wherein the charging device comprises a controller connected to the switch and configured to issue closing the switch.

5. The wind turbine of claim 2, further comprising a voltage switchgear comprising the switch and a voltage transformer comprising a high-voltage side connected to the external grid and a low voltage side, wherein the charging device is connected to the low voltage side of the voltage transformer.

6. The wind turbine of claim 1, wherein the charging device comprises an inverter connected to the low-voltage side of the transformer and configured to output at least one rising ac output-signal to the low-voltage side of the transformer.

7. The wind turbine of claim 6, wherein the inverter is configured to ramp the at least one rising ac output-signal substantially to a rated voltage of the electrical power generating unit.

8. The wind turbine of claim 6, wherein the charging device comprises an energy buffer connected to the inverter, the energy buffer being chargeable with a power of the external grid.

9. The wind turbine of claim 6, wherein the charging device comprises a controller which is configured to detect a recovery of the external grid and to control the inverter such that the at least one rising ac output-signal is substantially in phase with the external grid.

10. The wind turbine of claim 6, further comprising a sensor connected to the external grid and a controller connected to the sensor and configured to control the inverter such that at least one rising ac output-signal is substantially in phase with the external grid.

11. A wind turbine comprising:
    a transformer comprising a low-voltage side and a high-voltage side and configured to step up a low voltage at the low-voltage side to a high voltage of an external grid;
    an electrical power generating unit connected to the low-voltage side of the transformer and configured to feed an ac-power to the low-voltage side of the transformer;
    a charging device connected to the low-voltage side of the transformer and configured to charge the low-voltage side of the transformer when the electrical power generating unit does not feed ac-power to the low-voltage side of the transformer; and
    a voltage switchgear comprising a switch connected between the external grid and the high-voltage side of the transformer and configured to open and close a connection between the high-voltage side of the transformer and the external grid, the voltage switchgear further comprising a voltage transformer comprising a high-voltage side connected to the external grid and a low voltage side connected to the low voltage side of the voltage transformer.

* * * * *